United States Patent
Nasu et al.

(10) Patent No.: US 9,026,753 B2
(45) Date of Patent: May 5, 2015

(54) SNAPSHOT VOLUME GENERATIONAL MANAGEMENT FOR SNAPSHOT COPY OPERATIONS USING DIFFERENTIAL DATA

(75) Inventors: Hiroshi Nasu, Yokohama (JP); Toru Tanaka, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 200 days.

(21) Appl. No.: 13/496,036

(22) PCT Filed: Feb. 16, 2012

(86) PCT No.: PCT/JP2012/001034
§ 371 (c)(1),
(2), (4) Date: Mar. 14, 2012

(87) PCT Pub. No.: WO2013/121465
PCT Pub. Date: Aug. 22, 2013

(65) Prior Publication Data
US 2013/0219138 A1    Aug. 22, 2013

(51) Int. Cl.
*G06F 12/00* (2006.01)
*G06F 3/06* (2006.01)
*G06F 11/14* (2006.01)

(52) U.S. Cl.
CPC ............ *G06F 3/0608* (2013.01); *G06F 3/061* (2013.01); *G06F 3/0646* (2013.01); *G06F 3/0662* (2013.01); *G06F 3/067* (2013.01); *G06F 11/1451* (2013.01); *G06F 2201/84* (2013.01)

(58) Field of Classification Search
CPC . G06F 3/0608; G06F 3/0646; G06F 2201/84; G06F 11/1453; G06F 11/1451; G06F 11/1448
See application file for complete search history.

(56) References Cited

U.S. PATENT DOCUMENTS

| | | | |
|---|---|---|---|
| 6,668,264 B1 | 12/2003 | Patterson et al. | |
| 7,100,089 B1 | 8/2006 | Phelps | |
| 7,743,031 B1* | 6/2010 | Cameron et al. | 707/649 |
| 2005/0210209 A1* | 9/2005 | Nagata | 711/162 |
| 2006/0230243 A1* | 10/2006 | Cochran et al. | 711/162 |
| 2008/0183995 A1* | 7/2008 | Satoyama et al. | 711/162 |
| 2009/0070538 A1* | 3/2009 | Tabuchi et al. | 711/162 |
| 2010/0106688 A1* | 4/2010 | Higuchi et al. | 707/640 |

(Continued)

FOREIGN PATENT DOCUMENTS

| | | |
|---|---|---|
| EP | 2 306 320 B1 | 5/2012 |
| JP | 2010-102479 | 5/2010 |

OTHER PUBLICATIONS

PCT International Search Report and Written Opinion on application 341151055 mailed Jul. 20, 2012; 13 pages.

*Primary Examiner* — Aimee Li
*Assistant Examiner* — Michael C Kolb
(74) *Attorney, Agent, or Firm* — Foley & Lardner LLP

(57) ABSTRACT

A snapshot volume is migrated by using a primary volume of a migration destination storage apparatus. The management server comprises a controller for generational management, by means of the snapshot volumes, of differential data for the logical volume which is the parent volume of the snapshot volume, and, if an instruction to copy a snapshot volume of a designated generation is received and a snapshot volume prior to the designated generation of the copy instruction-target snapshot volume exists, the controller copies the differential data between the designated-generation snapshot volume and the existing snapshot volume, and associates the copied differential data with the existing snapshot volume.

14 Claims, 19 Drawing Sheets

(56) References Cited

U.S. PATENT DOCUMENTS

| | | |
|---|---|---|
| 2011/0071983 A1* | 3/2011 | Murase .................. 707/649 |
| 2011/0107025 A1* | 5/2011 | Urkude et al. ............. 711/112 |
| 2011/0252208 A1 | 10/2011 | Ali et al. |
| 2011/0296127 A1* | 12/2011 | Agombar et al. ............. 711/162 |
| 2012/0278553 A1* | 11/2012 | Mudhiganti et al. .......... 711/114 |
| 2013/0086342 A1* | 4/2013 | Beeken et al. ................ 711/162 |

* cited by examiner

FIG. 2
PATTERN2
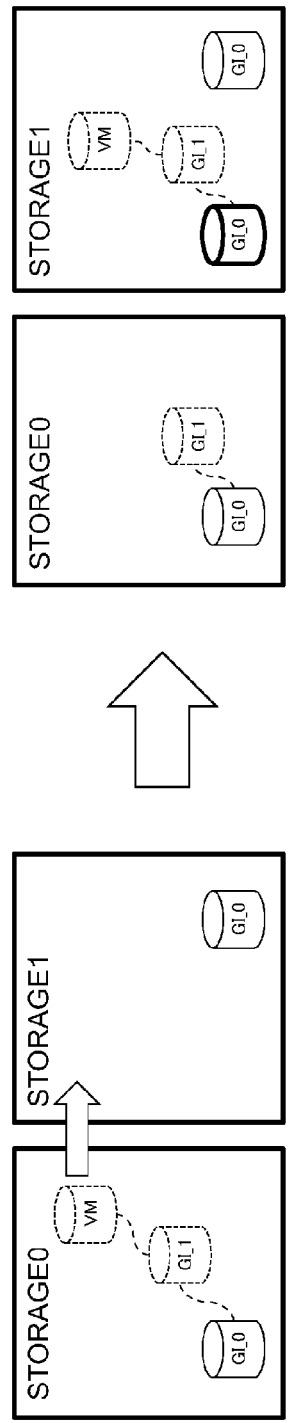
PRIOR ART
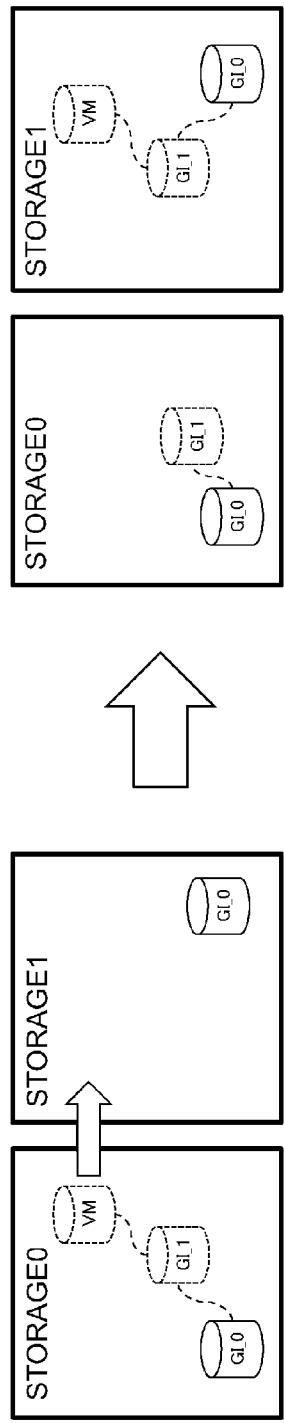
PRESENT INVENTION

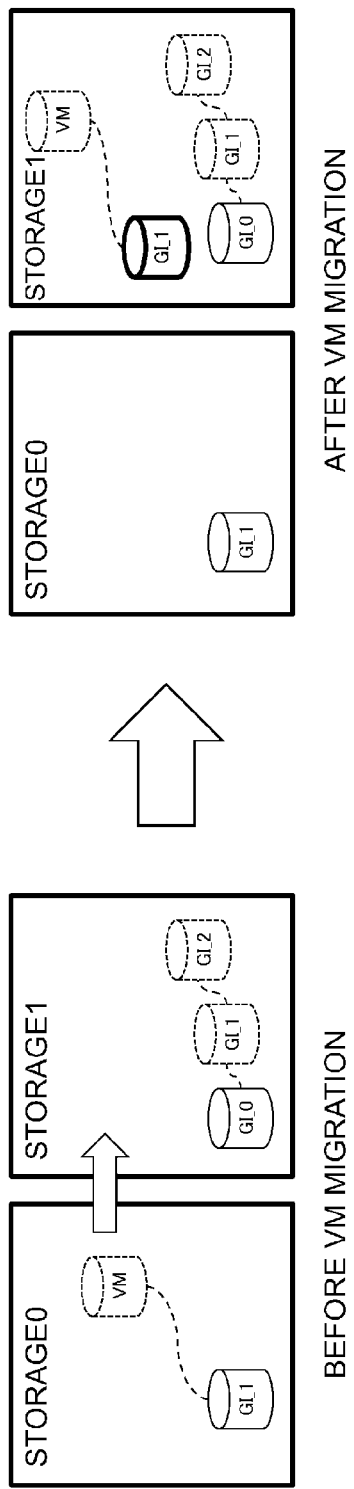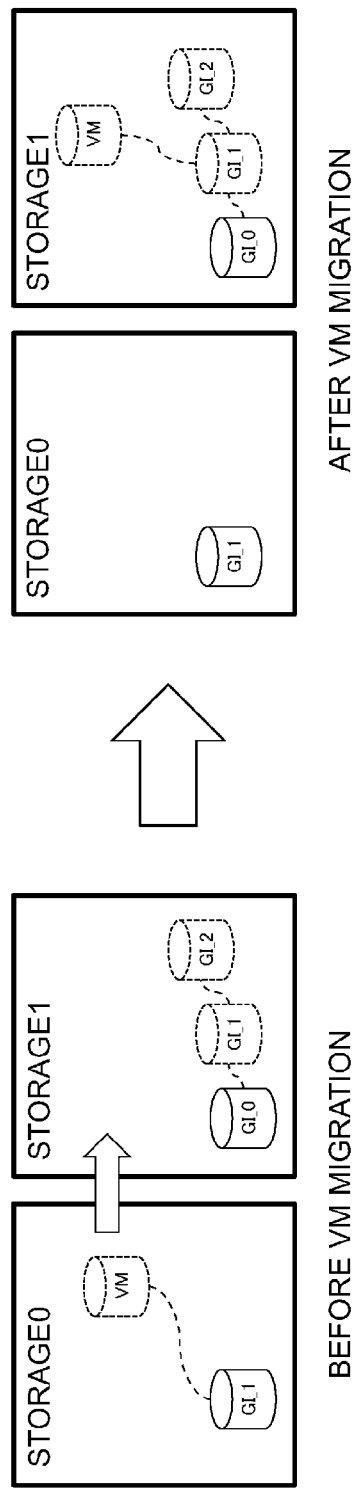
FIG. 3

FIG.8

| LUN | PARENT LUN |
|-----|------------|
| 101 | NULL |
| 102 | 101 |
| 103 | 102 |

151A 1511  1512

SNAPSHOT CONFIGURATION MANAGEMENT TABLE
(FIRST STORAGE APPARATUS)

| LUN | PARENT LUN |
|-----|------------|
| 201 | NULL |

151B 1511  1512

SNAPSHOT CONFIGURATION MANAGEMENT TABLE
(SECOND STORAGE APPARATUS)

FIG.9

| LUN | LOGICAL ADDRESS | PHYSICAL ADDRESS |
|---|---|---|
| 101 | L1001 | P0101 |
| 101 | L1002 | P0102 |
| ... | ... | ... |
| 101 | L1121 | P0221 |
| 102 | L2001 | L0001 |
| 102 | L2002 | P1001 |
| ... | ... | ... |
| 102 | L2121 | L1121 |
| 103 | L3001 | P2101 |
| 103 | L3002 | L2002 |
| ... | ... | ... |
| 103 | L3121 | P2341 |

152A 1521  1522  1523

VOLUME DATA MAPPING MANAGEMENT TABLE
(FIRST STORAGE APPARATUS)

| LUN | LOGICAL ADDRESS | PHYSICAL ADDRESS |
|---|---|---|
| 201 | L1001 | P1011 |
| 201 | L1002 | P1012 |
| ... | ... | ... |
| 201 | L1121 | P1131 |

152B 1521  1522  1523

VOLUME DATA MAPPING MANAGEMENT TABLE
(SECOND STORAGE APPARATUS)

FIG.10

| LUN | LOGICAL ADDRESS | PHYSICAL ADDRESS |
|---|---|---|
| 101 | L1001 | P0101 |
| 101 | L1002 | P0102 |
| ... | ... | ... |
| 101 | L1121 | P0221 |
| 102 | L2001 | L0001 |
| 102 | L2002 | P1001 |
| ... | ... | ... |
| 102 | L2121 | L1121 |

152C 1521  1522  1523

VOLUME DATA MAPPING MANAGEMENT TABLE
(FIRST STORAGE APPARATUS)

| LUN | LOGICAL ADDRESS | PHYSICAL ADDRESS |
|---|---|---|
| 201 | L1001 | P1011 |
| 201 | L1002 | P1012 |
| ... | ... | ... |
| 201 | L1121 | P1131 |
| 103 | L3001 | P5210 |
| 103 | L3002 | L2002 |
| ... | ... | ... |
| 103 | L3121 | P5321 |

152D 1521  1522  1523

VOLUME DATA MAPPING MANAGEMENT TABLE
(SECOND STORAGE APPARATUS)

BEFORE VIRTUAL MACHINE MIGRATION

| GI ID | STORAGE ID | LUN | PARENT GI ID | COPY SOURCE GI ID | OS |
|---|---|---|---|---|---|
| GI_1 | 1 | 101 | NULL | NULL | Win |
| GI_2 | 1 | 102 | GI_1 | NULL | Win SP1 |
| GI_3 | 2 | 201 | NULL | GI_2 | Win SP1 |
| 3111 | 3112 | 3113 | 3114 | 3115 | 3116 |

311

LOGICAL VOLUME MANAGEMENT TABLE

| VM ID | STORAGE ID | LUN | DEPLOY SOURCE GI ID |
|---|---|---|---|
| VM_1 | STORAGE1 | 103 | GI_2 |
| 3121 | 3122 | 3123 | 3124 |

312

VIRTUAL MACHINE MANAGEMENT TABLE

AFTER VIRTUAL MACHINE MIGRATION

| GI ID | STORAGE ID | LUN | PARENT GI ID | COPY SOURCE GI ID | OS |
|---|---|---|---|---|---|
| GI_1 | 1 | 101 | NULL | NULL | Win |
| GI_2 | 1 | 102 | GI_1 | NULL | Win SP1 |
| GI_3 | 2 | 201 | NULL | GI_2 | Win SP1 |
| 3111 | 3112 | 3113 | 3114 | 3115 | 3116 |

311

LOGICAL VOLUME MANAGEMENT TABLE

| VM ID | STORAGE ID | LUN | DEPLOY SOURCE GI ID |
|---|---|---|---|
| VM_1 | STORAGE1 | 103 | GI_3 |
| 3121 | 3122 | 3123 | 3124 |

312

VIRTUAL MACHINE MANAGEMENT TABLE

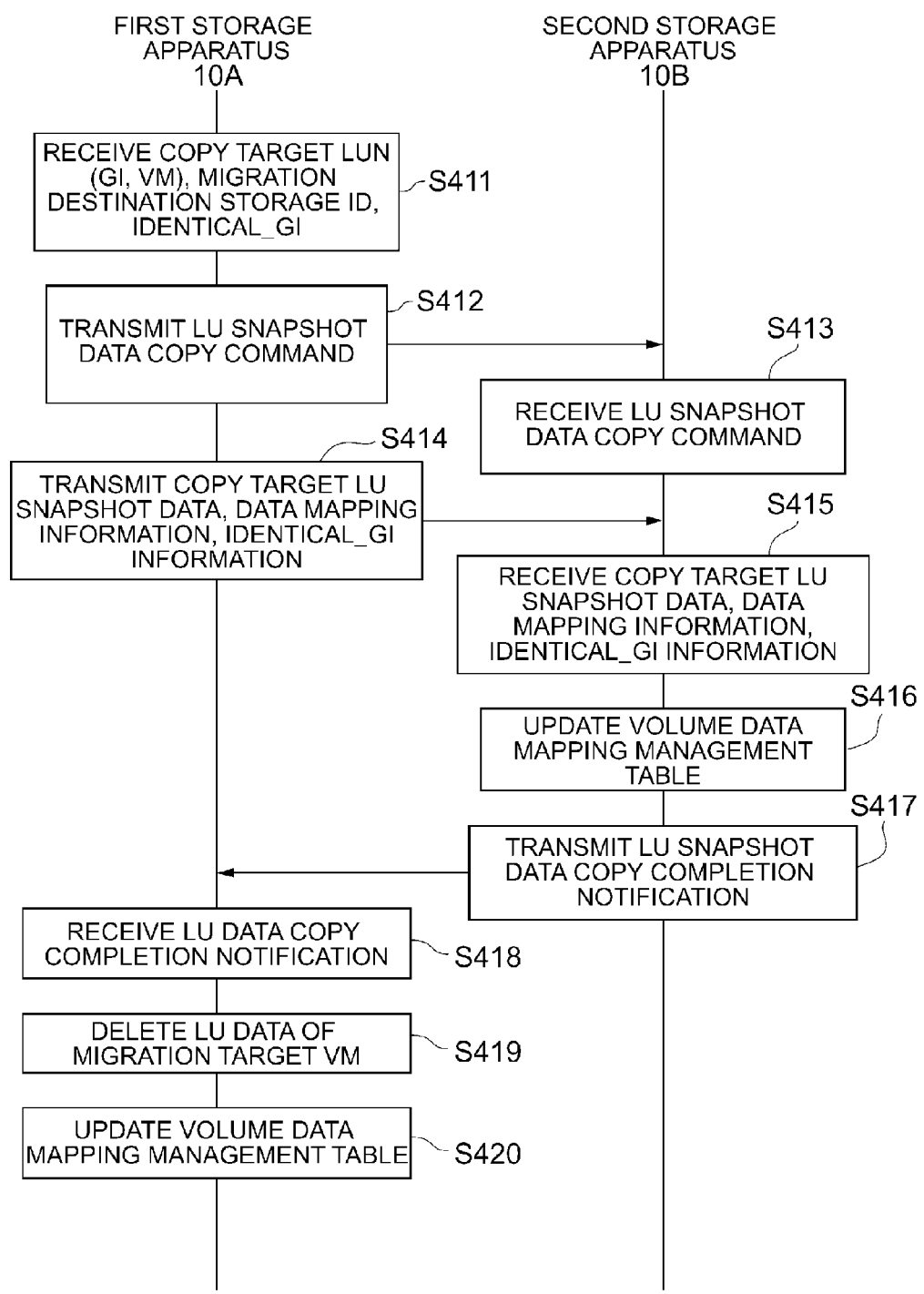

# SNAPSHOT VOLUME GENERATIONAL MANAGEMENT FOR SNAPSHOT COPY OPERATIONS USING DIFFERENTIAL DATA

TECHNICAL FIELD

The present invention relates to a storage system, management server, storage apparatus and a data management method, and is suitably applied to a storage apparatus on which a snapshot function is installed and to a management server, storage apparatus and a data management method.

BACKGROUND ART

Conventionally, some storage apparatuses have a snapshot function which holds an image of a logical volume (hereinafter called a source volume) at a time point when a snapshot creation instruction is received. The snapshot function makes it possible to restore the source volume at a time point in case that data is lost due to human error or the state of a file system at a desired time point is to be restored.

If a snapshot is created by the snapshot function, data which precedes data overwriting (hereinafter called previous data) is subsequently saved to a previous data save logical volume with the timing at which data is written to the source volume. That is, the difference between the source volume at the time point when the snapshot creation instruction is received and the current source volume is saved to the previous data save logical volume as previous data. Hence, a data image (snapshot) of the source volume at the snapshot creation time point can be restored by combining the data stored in the current source volume with the previous data stored in the previous data save logical volume.

A snapshot function described above is advantageous in that the source volume at the time point when snapshot creation is ordered can be restored using a smaller storage capacity in comparison with a case where the content of the source volume is stored as is.

Furthermore, technology may also be provided whereby, if a plurality of updatable snapshots (Writable Snapshots: WSS) are provided, update content can be efficiently copied to all the snapshots if necessary (see PTL1). According to PTL 1, for example, because a volume (golden image: GI) whereon an OS is installed can be logically copied, a virtual machine can be rapidly placed in an available state (deployed). Further, the disk usage amount can be reduced because the golden image is shared between virtual machines.

For example, if writing is performed to the golden image by way of a patch application which is applied to the OS, or the like, a snapshot of a golden image serving as the target is created, and the patch data is written as differential data to the created snapshot. When the snapshot is read, reading of an area where patch data is written is performed to the differential data and reading from a common area is performed to the golden image.

When a virtual machine is provided, since the golden image (OS, patch version, installed application or the like) required to initiate the operation is unknown, golden images of plural generations (cascade configuration) may be held. Further, there are cases where a virtual machine is deployed by copying the latest golden image volume between storages and creating a snapshot from the copied golden image.

CITATION LIST

Patent Literature

PTL 1: Japanese Published Unexamined Application No. 2010-102479

SUMMARY OF INVENTION

Technical Problem

In PTL 1, when data of a virtual machine snapshot is migrated between storages, the snapshot generation configuration is also maintained in the migration destination storage apparatus. For this reason, if the same golden image and the same snapshot generation configuration as in the migration source storage apparatus do not exist in the migration destination storage apparatus, there is a problem in that a full copy of the generation configuration containing the snapshot primary volume (golden image) must be made and data migration takes time.

The present invention was conceived in view of the above points and proposes a storage system, a management server, a storage apparatus, and a data management method to which a snapshot volume can be migrated by using the primary volume of the migration destination storage apparatus.

Solution to Problem

In order to achieve the foregoing object, the present invention provides a storage system in which a storage apparatus, a host which issues data write requests to the storage apparatus, and a management server which manages the storage apparatus and the host are interconnected via a network, wherein the storage apparatus comprises one or more storage devices providing storage areas, and a controller which creates a logical volume in the storage areas provided by the one or more storage devices and which creates one or more snapshot volumes which are data images at a certain time point of the logical volume, wherein the management server comprises a controller for generational management, by means of the snapshot volumes, of differential data for the logical volume which is the parent volume of the snapshot volume, and wherein, if an instruction to copy a snapshot volume of a designated generation is received and a snapshot volume prior to the designated generation of the copy instruction-target snapshot volume exists, the controller copies the differential data between the designated-generation snapshot volume and the existing snapshot volume, and associates the copied differential data with the existing snapshot volume.

According to this configuration, if a copy instruction to copy a snapshot volume of a designated generation is received and a snapshot volume prior to the designated generation of the copy instruction-target snapshot volume exists, the differential data between the designated-generation snapshot volume and the snapshot volume which exists at the copy destination is copied and the copied differential data is associated with the snapshot volume which exists at the copy destination. As a result, even when the copy destination snapshot volume differs from the copy source snapshot volume, because it is possible to migrate the snapshot volume by using the snapshot volume which exists at the copy destination, the data copy size at the time of snapshot volume migration can be minimized and the processing time to migrate the snapshot volume can be reduced.

Advantageous Effects of Invention

With the present invention, by using the primary volume of the migration destination storage apparatus to migrate a snapshot volume, the data copy size at the time of snapshot volume migration between storage apparatuses can be minimized and the processing time to migrate the snapshot volume can be reduced.

BRIEF DESCRIPTION OF DRAWINGS

FIG. 2 is a conceptual diagram providing an overview of the embodiment.

FIG. 3 is a conceptual diagram providing an overview of the embodiment.

FIG. 8 is a table showing an example of a snapshot configuration management table according to this embodiment.

FIG. 9 is a table showing an example of a volume data mapping management table according to the embodiment.

FIG. 10 is a table showing an example of a volume data mapping management table according to the embodiment.

FIG. 19 is a flowchart showing details of a snapshot volume migration processing according to the embodiment.

DESCRIPTION OF EMBODIMENTS

An embodiment of the present invention will be described hereinbelow with reference to the drawings.

(1) Overview of the Embodiment

Conventionally, some storage apparatuses have a snapshot function which holds an image of a logical volume (hereinafter called a source volume) at a time point when a snapshot creation instruction is received. The snapshot function makes it possible to restore the source volume at a time point in case that data is lost due to human error or when the state of a file system at a desired time point is to be restored.

If a snapshot is created by the snapshot function, data which precedes data overwriting (hereinafter called previous data) is subsequently saved to a previous data save logical volume with the timing at which data is written to the source volume. That is, the difference between the source volume at the time point when the snapshot creation instruction is received and the current source volume is saved to the previous data save logical volume as previous data. Hence, a data image (snapshot) of the source volume at the snapshot creation time point can be restored by combining the data stored in the current source volume with the previous data stored in the previous data save logical volume.

A snapshot function described above is advantageous in that the source volume at the time point when snapshot creation is ordered can be restored using a smaller storage capacity in comparison with a case where the content of the source volume is stored as is.

Furthermore, technology may also be provided whereby, if a plurality of updatable snapshots (Writable Snapshots: WSS) are provided, update content can be efficiently copied to all the snapshots if necessary. With such technology, for example, because a volume (golden image: GI) whereon an OS is installed can be logically copied, a virtual machine can be rapidly placed in an available state (deployed). Further, the disk usage amount can be reduced because the golden image is shared between virtual machines.

For example, if writing is performed to the golden image by way of a patch application to the OS, or the like, a golden image snapshot, serving as the target, is created, and the patch data is written as differential data of the created snapshot. When a snapshot is read, reading from an area where patch data is written is performed for the differential data and reading from a common area is performed for the golden image.

If a virtual machine is provided, since the golden image (OS, patch version, installed application or the like) required to initiate the operation is unknown, golden images of plural generations (cascade configuration) are held. Further, there are cases where a virtual machine is deployed by copying the latest golden image volume between storage and creating a snapshot from the copied golden image.

Figure 1:
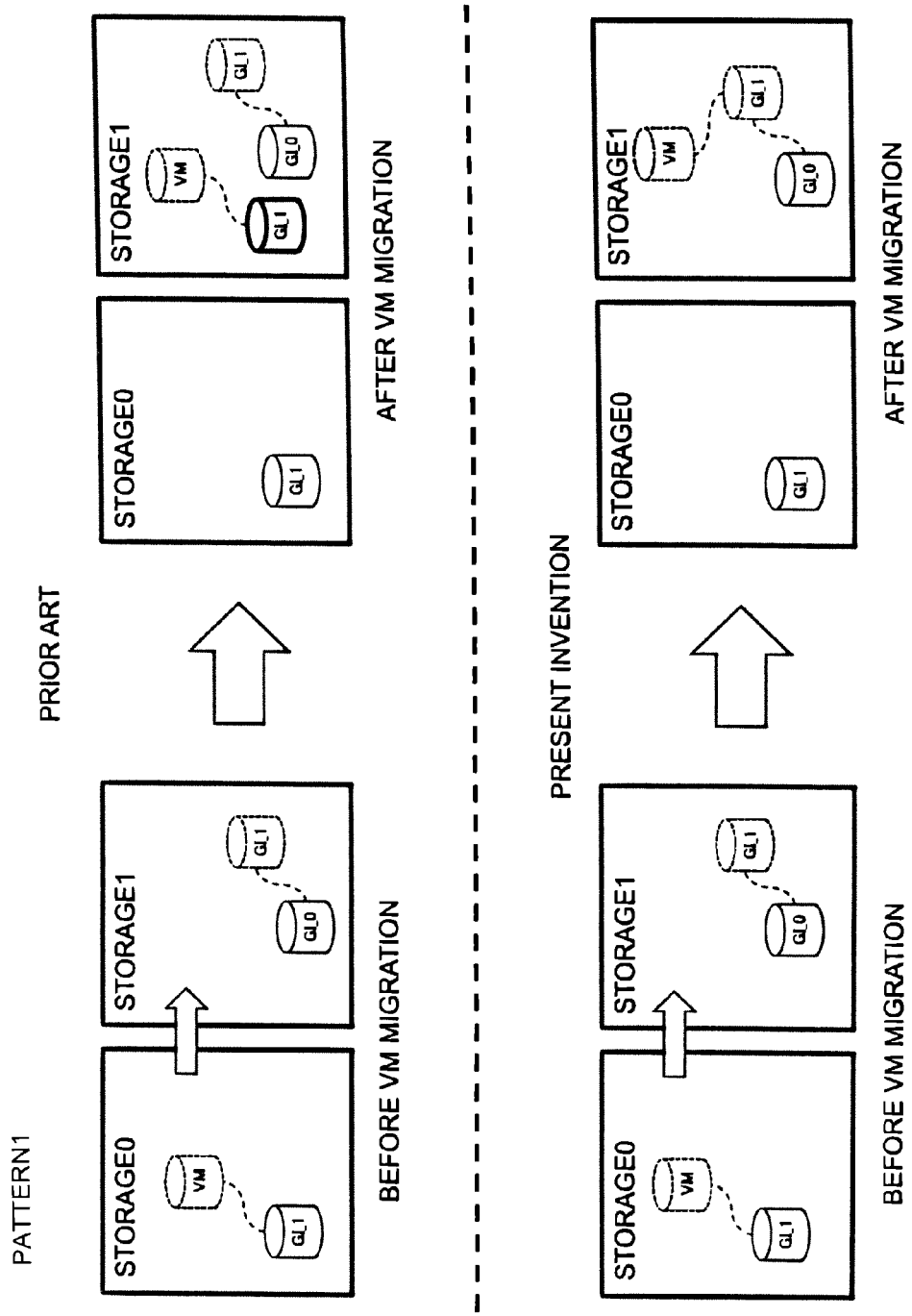
FIG. 1 is a conceptual diagram providing an overview of an embodiment of the present invention.

For example, a case will now be described where a virtual machine (abbreviated as VM in the drawings) is migrated from a storage0 to a storage1. The migration pattern 1 in FIG. 1 represents a case where a golden image (GI_1) exists in the storage0 and a golden image (GI_0) exists in the storage1 and where a golden image (GI_1) snapshot is migrated from the storage0 to the storage1. Conventionally, since a golden image generation configuration which is the same as that of the migration source storage0 does not exist in the migration destination storage1, a full copy of the golden image (GI_1) serving as the snapshot primary volume is required.

However, in this embodiment, even when there is a difference between the migration-source and migration-destination golden image generation configurations, if a golden image (GI_0) which is the copy source of the golden image (GI_1) exists in the migration destination storage1, only the differential data of the golden image (GI_0) is copied to the storage1 to create the snapshot. Accordingly, the data copy size at the time of snapshot volume migration can be minimized and the processing time to migrate the snapshot volume can be reduced.

Furthermore, the migration pattern 2 in FIG. 2 represents a case where a golden image (GI_1) and a golden image (GI_0) exist in the storage0, a golden image (GI_0) exists in storage1, and the snapshot of the golden image (GI_1) is migrated from the storage0 to the storage1. Conventionally, because the same golden image generation configuration as that of the migration source storage0 does not exist in the migration destination storage1, a full copy of the golden image (GI_1) and the golden image (GI_0) serving as the snapshot primary volume is required. However, with this embodiment, even when there is a difference between the golden image generation configurations of the migration source and migration destination, if the golden image (GI_0) exists in the migration destination storage1, the differential data (GI_1) of the golden image (GI_0) can be copied to the storage1 to create the snapshot.

Furthermore, the migration pattern 3 in FIG. 3 represents a case where a golden image (GI_1) exists in the storage0 and golden images (GI_0), (GI_1), (GI_2) exist in storage1, and where a snapshot of the golden image (GI_1) is migrated from storage0 to storage1. Conventionally, because the same golden image configuration generation as the migration source storage0 does not exist in the migration destination storage1, a full copy of the golden image (GI_1) serving as the snapshot primary volume is required. However, with this embodiment, even when there is a difference between the migration-source and migration-destination golden image generation configurations, if a golden image (GI_1) exists in the migration destination storage1, a snapshot can be created from the existing golden image (GI_1).

Accordingly, with this embodiment, even when there is a difference between the migration-source and migration-destination golden image (primary volume) generation configurations, a snapshot volume can be migrated by using the primary volume of the migration destination storage apparatus. As a result, the data copy size at the time of snapshot volume migration between storage apparatuses can be minimized and the processing time to migrate the snapshot volume can be reduced.

(2) Computer System Configuration

Figure 4:
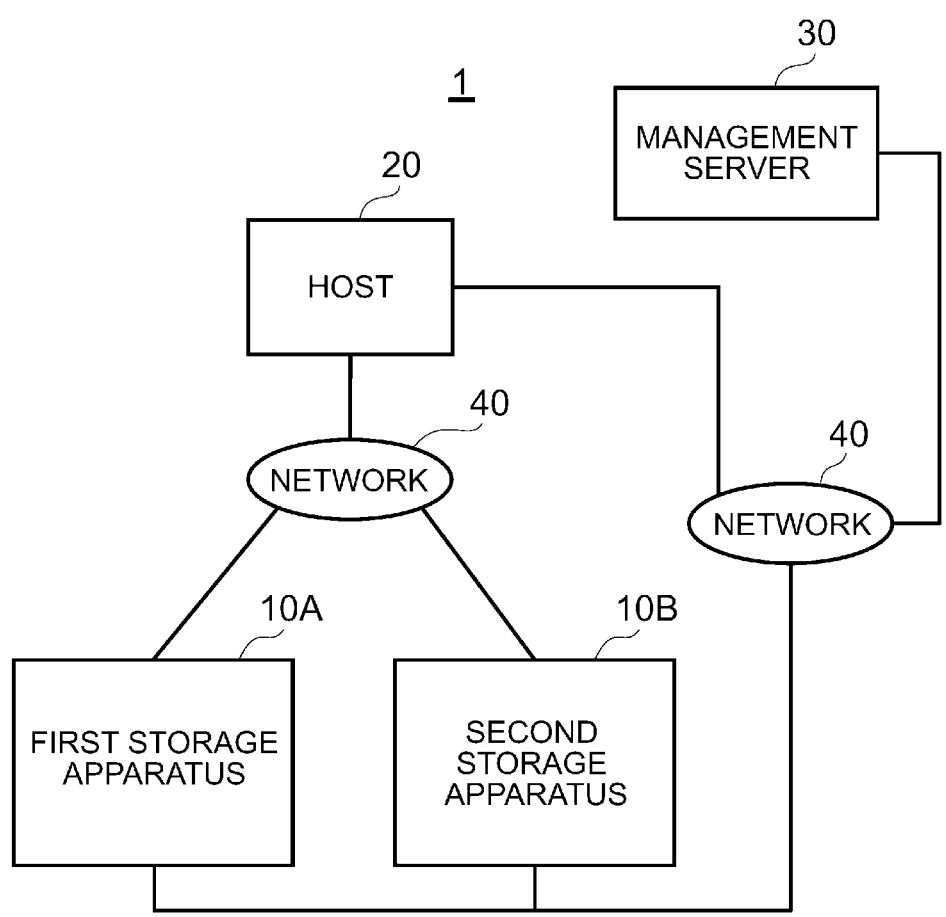
FIG. 4 is a block diagram showing the overall configuration of a computer system according to the embodiment.

FIG. 4 shows a hardware configuration of a computer system 1. As shown in FIG. 4, the computer system 1 is configured comprising a first storage apparatus 10A connected via one or more networks 40, a second storage apparatus 10B (hereinafter the first storage apparatus 10A and second storage apparatus 10B may be referred to in the description under the general term storage apparatus 10), a host 20, and a management server 30.

The network 40 is configured from a SAN (Storage Area Network), a LAN, the Internet, a public line or lease line or the like, for example. Communications between the host 20 and the storage apparatus 10 via the network 40 are performed according to the fibre channel protocol if the network 40 is a SAN and performed according to the TCP/IP (Transmission Control Protocol/Internet Protocol) protocol if the network 40 is a LAN, for example. Further, the management server 30 is connected to the storage apparatus 10 and the host 20 via a LAN.

(2-1) Host Configuration

Figure 5:
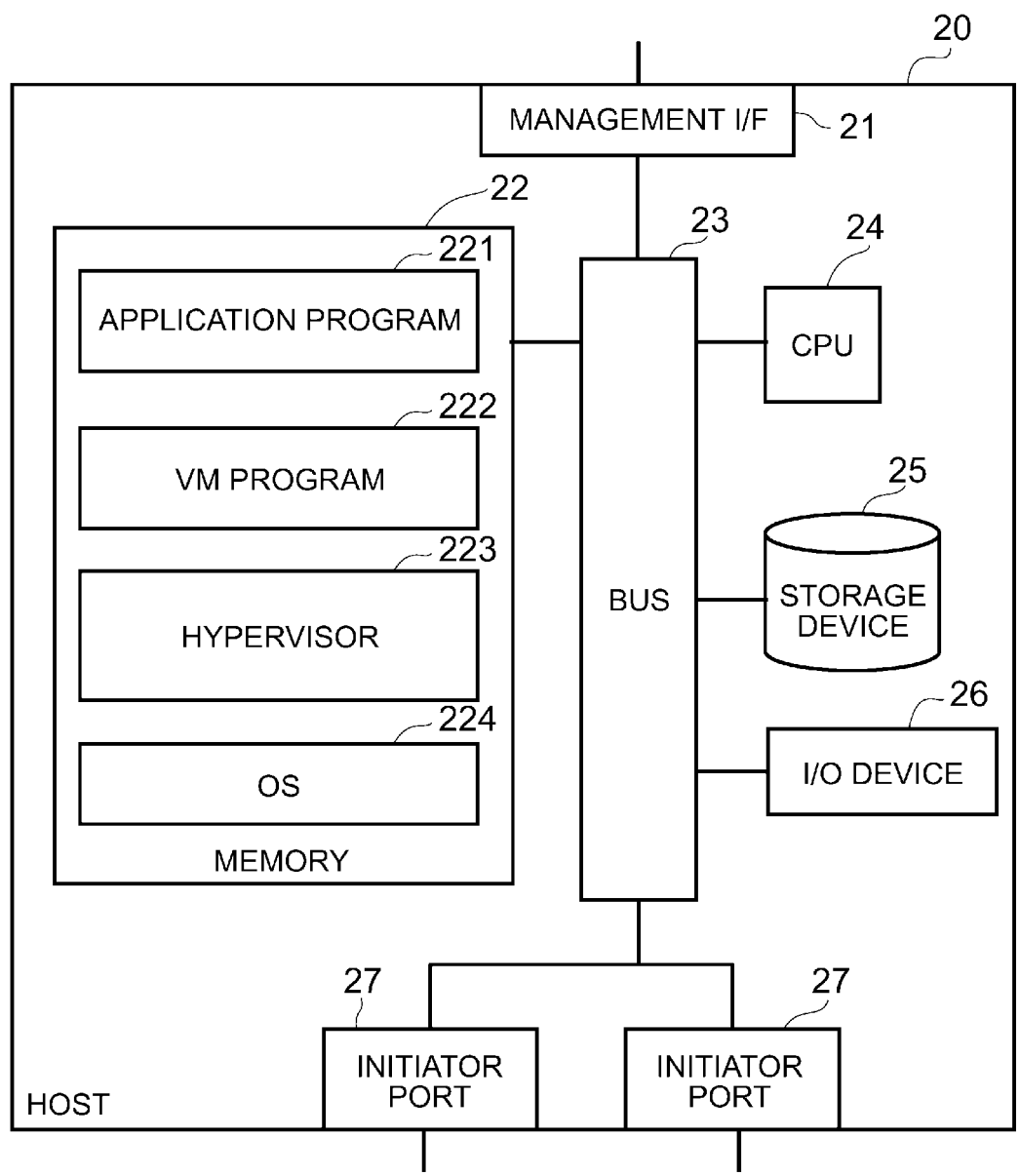
FIG. 5 is a block diagram showing the configuration of a host according to the embodiment.

FIG. 5 shows the configuration of the host 20. The host 20 comprises a management interface (management I/F in drawings) 21, memory 22, a bus 23, a CPU 24, a storage device 25, an I/O device 26, and an initiator port 27.

The management interface (abbreviated as management I/F in the drawings) 21 is an interface for connecting to the management server 30. The CPU 24 functions as an arithmetic processing device and controls the operation of the host 20 according to the programs and arithmetic parameters stored in the memory 22. The bus 23 comprises a function for interconnecting the CPU 24, the memory 22, and the storage device 25 and the like. The initiator port 27 is an interface for connecting to the storage apparatus 10.

The memory 22 stores programs executed by the CPU 24 and information required by the CPU 24, and the like. More specifically, the memory 22 stores the application program 221, the VM program 222, the hypervisor 223, and the OS 224. The application program 221 executes various processing. The VM program 222 is a program for providing one or more virtual machines. The hypervisor 223 is a program for operating various OS in a virtual machine provided by the VM program 222. The OS 224 is a program for controlling the processing of the host 20.

The storage device 25 is, for example, configured from a HDD (Hard Disk Drive) and stores programs executed by the CPU 24 and various data. The I/O device 26 is configured, for example, from input means enabling the user to input information such as a mouse, a keyboard, a touch panel, buttons, a microphone, a switch and levers, and from a display apparatus such as a CRT (Cathode Ray Tube) display device, a liquid crystal display (LCD) device, an OLED (Organic Light Emitting Display) device, and a lamp, for example.

(2-2) Storage Apparatus Configuration

Figure 6:
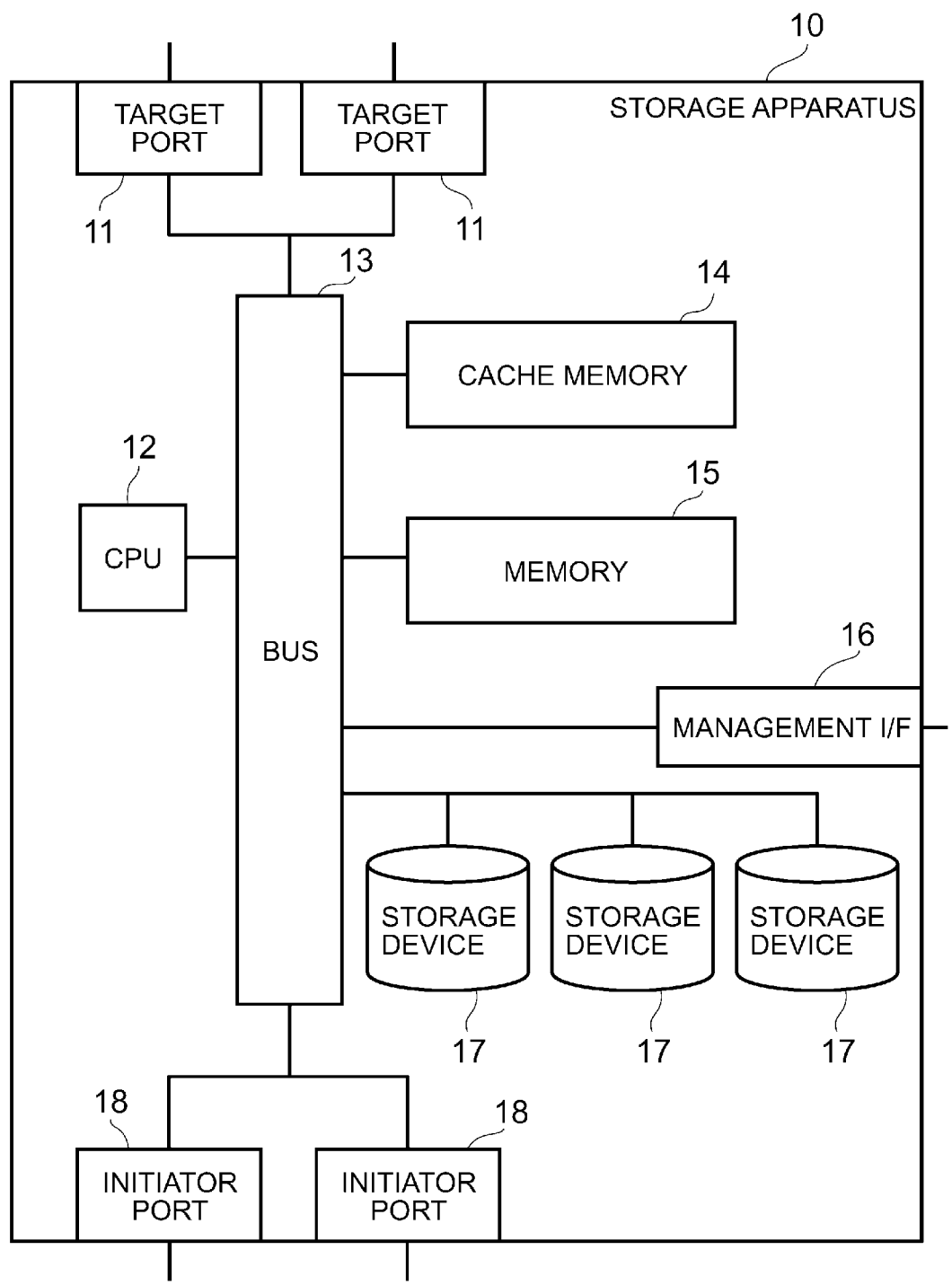
FIG. 6 is a block diagram showing the configuration of a storage apparatus according to the embodiment.

The configuration of the storage apparatus 10 is shown next. As shown in FIG. 6, the storage apparatus 10 is configured from a target port 11, a CPU 12, a bus 13, a cache memory 14, a memory 15, a management interface (management I/F in the drawings) 16, a storage device 17, and an initiator port 18.

The target port 11 is an interface for connecting to the host 20 and is assigned an IP (Internet Protocol) address corresponding to the host 20 and a unique network address such as a WWN (World Wide Name). Furthermore, the initiator port 18 is an interface for providing one or more logical volumes configured on a storage area of the storage device 17 to the host 20 and is assigned an IP (Internet Protocol) address corresponding to the logical volume and a unique network address such as an WWN (World Wide Name).

The CPU 12 performs various processing by executing programs stored in the memory 15. The bus 13 comprises a function for interconnecting the CPU 12, the cache memory 14, the memory 15, and the storage device 17 and the like.

The cache memory 14 is configured, for example, from a volatile memory such as an SDRAM (Synchronous Dynamic Random Access Memory) and temporarily stores the processing result of the data I/Os processed by the CPU 12. The memory 15 is used not only to store various control programs which are executed by the CPU 12 and information and the like required by the CPU 12 but also to temporarily hold various commands such as read commands and write commands which are supplied from the host 20.

The management interface (management I/F in the drawings) 16 is an interface for connecting to the management server 30.

The storage device 17 is operated by the CPU 12 using a RAID (Redundant Arrays of Inexpensive Disks) system. One or more logical volumes are configured in a physical storage area which is provided by one or more storage devices 17. Further, the data is stored by taking, as units, blocks (hereinafter called logical blocks) of a predetermined size in the logical volume VOL.

Unique identification numbers (hereinafter called LUN (Logical Unit number)) are assigned to each of the logical volumes and each of the logical blocks is assigned a unique identification number (hereinafter called LBA (Logical Block Address) in the corresponding logical volume. In the case of this embodiment, the data I/Os are performed by designating addresses which are obtained by combining the LUN and LBA.

Figure 7:
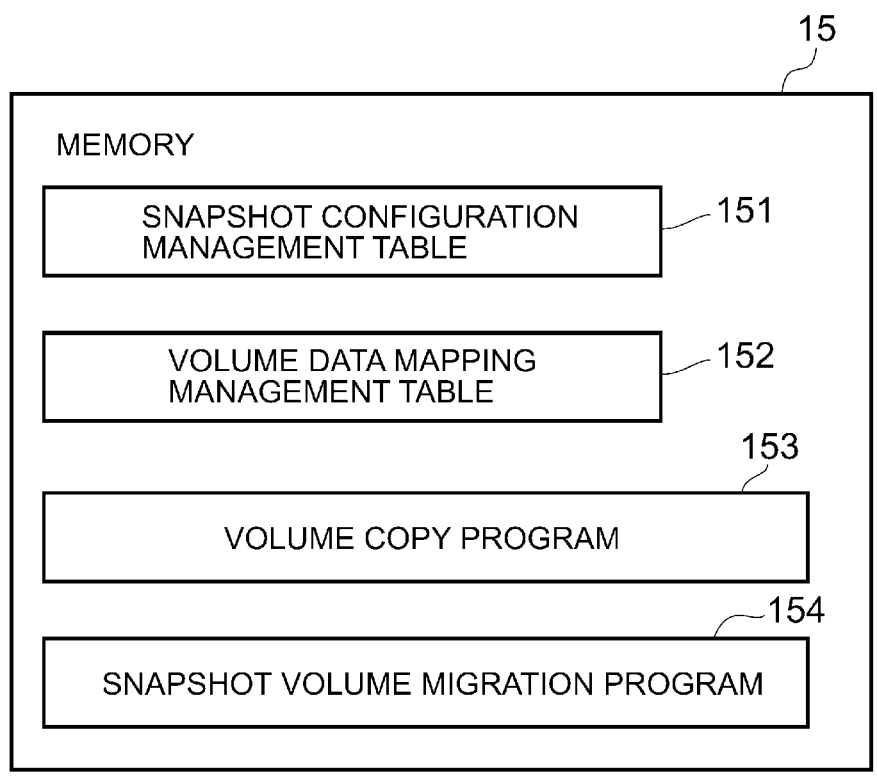
FIG. 7 is a block diagram showing the configuration of a memory of the storage apparatus according to the embodiment.

Furthermore, as shown in FIG. 7, the memory 15 stores a snapshot configuration management table 151, a volume data mapping management table 152, a volume copy program 153, and a snapshot volume migration program 154.

Here, the snapshot logical configuration installed in the storage apparatus 10 will be described. The snapshots are configured from three volumes, namely, a source volume, a target volume, and a data pool.

The source volume is a logical volume which is provided to the host 20 and to/from which the data from the host 20 is read and written. The source volume may be either a logical volume which comprises a normal entity and a virtual logical volume which has no substance.

The target volume is a virtual logical volume for holding snapshot data and is configured in a copy pair together with the source volume. The data pool is a logical volume in which snapshot management information and previous data copied from the source volume.

If a snapshot is created, when a write command targeting the source volume is then supplied to the storage apparatus 10, the data (previous data) in the source volume 120 immediately before same is updated by the write processing based on the write command is copied to the data pool. Further, by combining the data copied to the data pool and the data remaining in the source volume (data that has not been updated), it is possible to restore the data image (snapshot) of the source volume 120 immediately before the data is updated by the write processing.

For example, a maximum of 1024 target volumes can be configured for the same source volumes in the storage apparatus 10. In this case, the storage apparatus 10 is able to create a maximum of 1024 snapshots for the same source volume. Hereinafter, if a snapshot which is a logical volume data image is handled as a virtual volume, this snapshot will be termed as a snapshot volume in the description.

The snapshot configuration management table 151 is a table which manages the correspondence relationships between logical volumes (source volumes) and snapshot volumes (target volumes). As shown in FIG. 8, the snapshot configuration management table 151 is configured from a LUN field 1511 and a parent LUN field 1512. In FIG. 8, a snapshot configuration management table of a first storage apparatus 10A is 151A and a snapshot configuration management table of a second storage apparatus 10B is 151B. The LUN field 1511 stores logical volume identification numbers. The parent LUN field 1512 stores identification numbers of the logical volumes which are the copy source of the LUN field 1511.

For example, the snapshot configuration management table 151A shows that three volumes 101, 102, and 103 exist in the first storage apparatus 10A. Furthermore, [the table 151A] shows that the volume 101 is a parent volume of a snapshot volume, the volume 102 is a snapshot volume which is generated by copying the parent volume 101, and the volume 103 is a snapshot volume which is generated by copying the snapshot volume 102. Further, the snapshot configuration management table 151B shows that a single volume 201 exists in the second storage apparatus 10B. The volume 201 is a parent volume of the snapshot volume. Furthermore, any volume, i.e. a snapshot volume (golden image) with the OS installed or a snapshot volume which is used in a virtual machine, is managed by the management server 30, described subsequently.

Furthermore, the volume data mapping management table 152 is a table for managing addresses of each of the logical blocks of the volume. As shown in FIG. 9, the volume data mapping management table 152 is configured from a LUN field 1521, a logical address field 1522, and a physical address field 1523. In FIG. 9, the volume data mapping management table of the first storage apparatus 10A is denoted 152A, and the volume data mapping management table of the second storage apparatus 10B is denoted 152B. The LUN field 1521 stores volume identification numbers. The logical address field 1522 stores addresses corresponding to each of the logical blocks in the volumes. Furthermore, the physical address field 1523 stores the addresses of the storage area where data of each of the logical blocks is actually stored.

For example, the volume data mapping management table 152A shows addresses of each of the logical blocks of three volumes 101, 102, and 103 of the first storage apparatus 100A. As described earlier, the volumes 102 are snapshot volumes which are generated by copying the volumes 101. However, among the volumes 102, the physical address of the logical block indicated by a logical address L2001 stores L0001. The physical address L001 is the logical address of the volume 101. Further, the physical address of the logical block indicated by a logical address L2002 is P1001. It is clear that, if, instead of storing the logical address of the copy source volume 101, the physical address of the volume 102 stores a physical address, the logical block indicated by the address has been updated and the logical block is differential data for the volume 101.

Furthermore, when the snapshot volume is migrated, the volume copy program 153 comprises a function for copying the required logical volume and the snapshot volume. In addition, the snapshot volume migration program 154 comprises a function for acquiring, from the management server 30, differential data and an address map for the snapshot volume targeted for migration and copying the differential data and address map to the storage apparatus 10. The information of the differential data of the snapshot volume created from the management server 30 is copied to the snapshot configuration management table 151. Furthermore, the address map information of the snapshot volume is copied to the volume data mapping management table 152.

For example, FIG. 10 shows the volume data mapping management table 152 in a case where the volume 103 of the first storage apparatus 10A is migrated to the second storage apparatus 10B. The volume data mapping management table of the first storage apparatus 10A after migration of the volume 103 is denoted 152C and the volume data mapping management table of the second storage apparatus 10B after migration of the volume 103 is denoted 152D.

As shown in the volume data mapping management table 152D, there is no change in the logical address of the volume 103 after migration. Further, where physical addresses are concerned, the physical address of a new data storage location is stored as the physical address where the differential data for the copy source volume 102 is stored.

(2-3) Management Server Configuration

Figure 11:
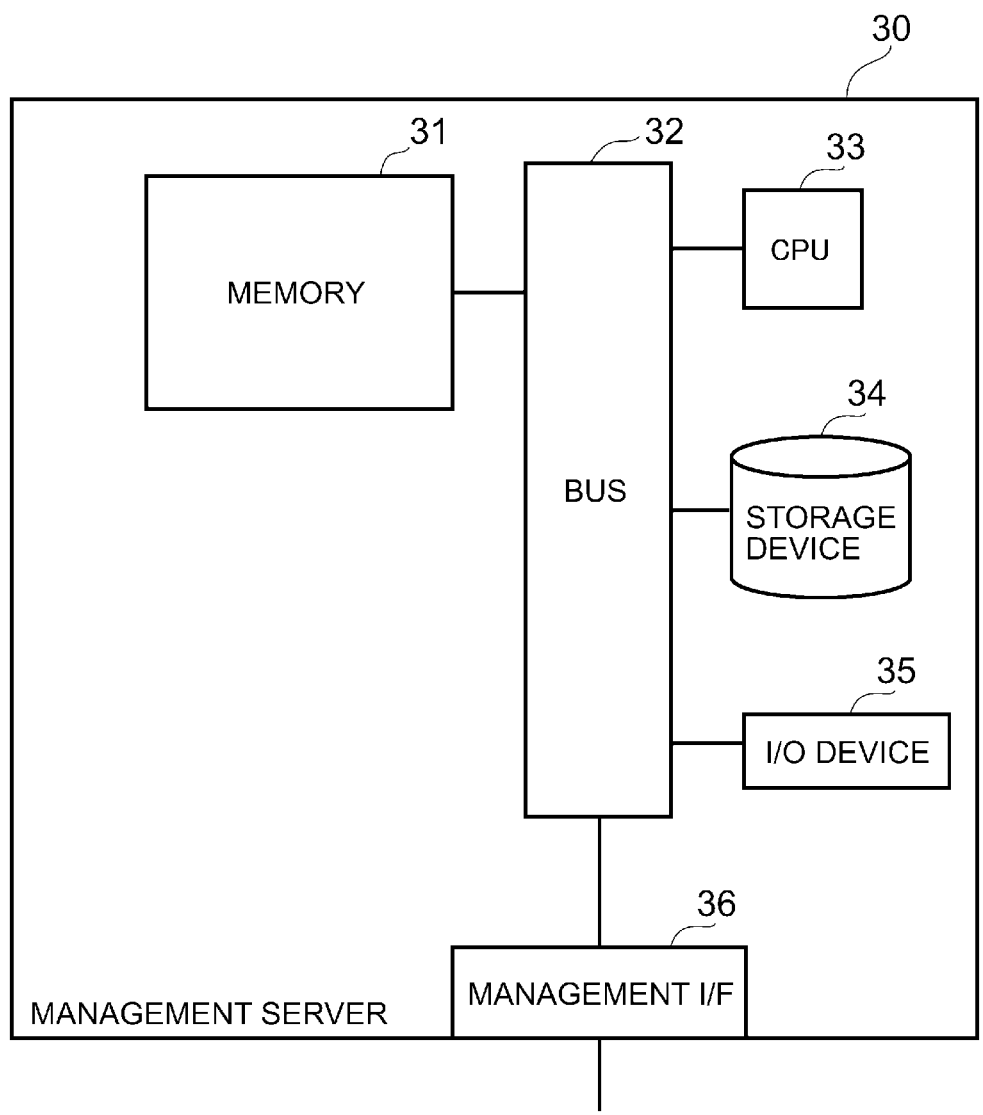
FIG. 11 is a block diagram showing the configuration of a management server according to the same embodiment.

The configuration of the management server 30 will be indicated next. The management server 30 is a computer device for archiving or managing the storage apparatus 10 and is configured from a personal computer or a workstation or the like, for example. Furthermore, as shown in FIG. 11, the management server 30 is configured from a memory 31, a bus 32, a CPU 33, a storage device 34, an I/O device 35, and a management interface (management I/F in the drawings) 36.

The CPU 33 functions as an arithmetic processing device and controls the operation of the management server 30 according to the programs and arithmetic parameters and the like stored in the memory 31. The bus 32 comprises a function for interconnecting the CPU 33, the memory 31, and the storage device 34 and the like. The storage device 34 is, for example, configured from a HDD (Hard Disk Drive), for example, and stores programs executed by the CPU 33 and various data. The I/O device 35 is configured, for example, from input means enabling the user to input information such as a mouse, a keyboard, a touch panel, buttons, a microphone, a switch and levers, and from a display apparatus such as a CRT (Cathode Ray Tube) display device, a liquid crystal display (LCD) device, an OLED (Organic Light Emitting Display) device, and a lamp, for example.

Figure 12:
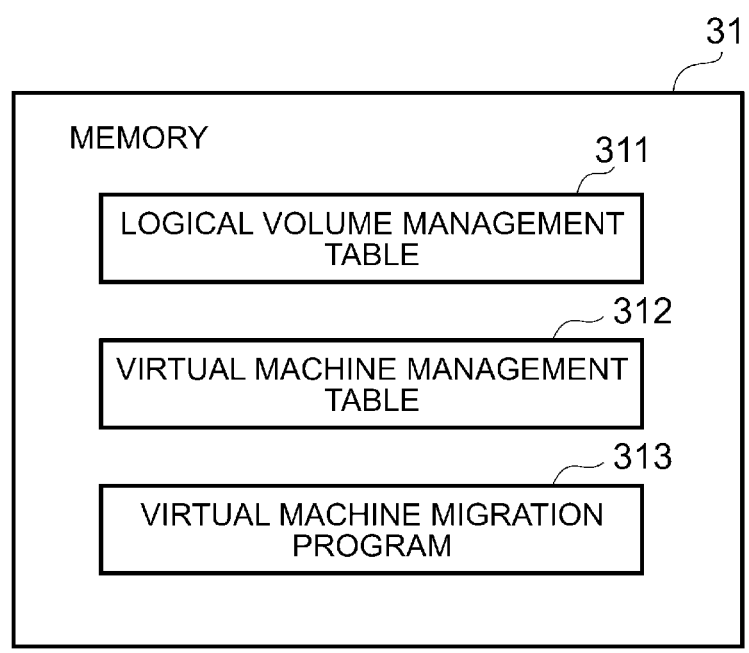
FIG. 12 is a block diagram showing the configuration of a memory of the management server according to the embodiment.

Furthermore, as shown in FIG. 12, the memory 31 above stores a logical volume management table 311, a virtual machine management table 312, and a virtual machine migration program 313.

Figure 13:
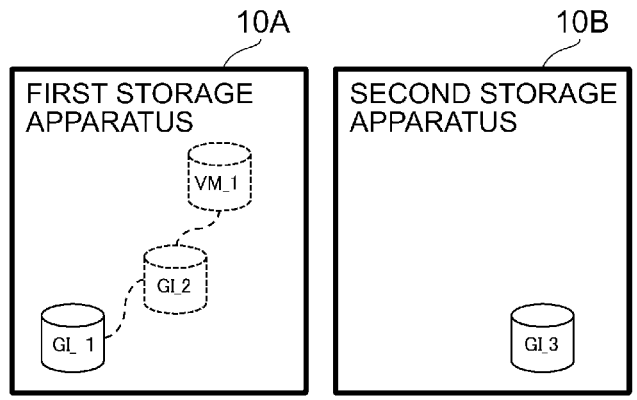
FIG. 13 is a conceptual diagram providing an overview before virtual machine migration according to the embodiment.

The logical volume management table 311 is a table for managing volumes which are golden images (GI) and for managing the LUN of the golden images (GI) and the copy history of the golden images. As shown in FIG. 13, the logical volume management table 311 is configured from a golden image (GI) ID field 3111, a storage ID field 3112, a LUN field 3113, a parent GI ID field 3114, a copy source golden image (GI) ID field 3115, and an OS field 3116.

The golden image (GI) ID field 3111 stores golden image identification information. The storage ID field 3112 stores identification information of the storage apparatuses where the golden image exists. The LUN field 3113 stores the LUN of the golden images. The parent golden image (GI) ID field 3114 stores identification information on the golden images (parent golden images (GI) prior to golden image updates. The copy source golden image (GI) ID field 3115 stores identification information of the golden image of the golden image copy source (copy source golden image (GI)). The OS field 3116 stores information on the OS types installed in the golden image (GI).

The virtual machine management table 312 is a table for managing snapshots for forming virtual machines and for managing which snapshot is which golden image (GI). As shown in FIG. 13, the virtual machine management table 312 is configured from a virtual machine (VM) ID field 3121, a storage ID field 3122, a LUN field 3123, and a deploy source golden image (GI) ID field 3124.

The virtual machine (VM) ID field 3121 stores virtual machine identification information. The storage ID field 3122 stores information identifying storage apparatuses 10 where virtual machines exist. The LUN field 3123 stores the LUNs of the snapshot volumes forming the virtual machines. The deploy source golden image (GI) ID field 3124 stores the golden image (GI) ID of the deploy sources of the snapshot volumes forming the virtual machines.

For example, FIG. 13 shows a logical volume management table 311 and a virtual machine management table 312 prior to virtual machine (VM_1) migration. It can be seen from the logical volume management table 311 that two golden image (GI) volumes, namely GI_1 and GI_2, exist in the first storage apparatus 10A, that the parent GI of the GI_2 is GI_1, that Win is installed in GI_1, and that WinSP1 is installed in GI_2. It can also be seen that a GI_3 golden image (GI) volume exists in the second storage apparatus 10B and the GI_3 copy source is GI_2. It can also be seen from the virtual machine management table 312 that the deploy source golden image of the virtual machine VM_1 of the first storage apparatus 10A is GI_2.

Figure 14:
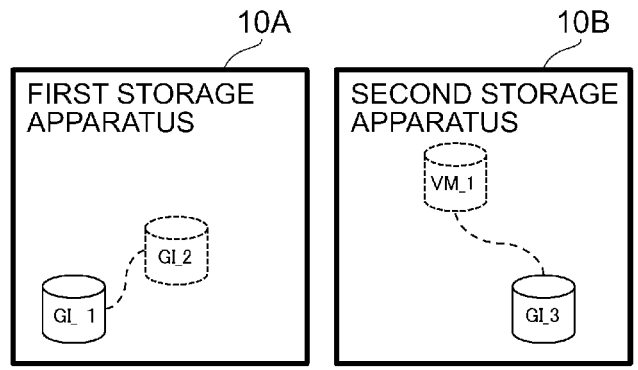
FIG. 14 is a conceptual diagram providing an overview after virtual machine migration according to the embodiment.

Furthermore, FIG. 14 shows a logical volume management table 311 and virtual machine management table 312 after virtual machine (VM_1) migration. As described earlier, the GI_3 copy source of the second storage apparatus 10B is GI_2 of the first storage apparatus 10A. Therefore, when the virtual machine (VM_1) is migrated from the first storage apparatus 10A to the second storage apparatus 10B, the deploy source GI_ID of the virtual machine (VM_1) is changed from GI_2 to GI_3, as shown in the virtual machine management table 312B. Accordingly, in this embodiment, when the virtual machine (VM_1) is migrated from the first storage apparatus 10A to the storage apparatus 10B, in order to use the migration destination golden image (GI), there is no need to migrate all the generation configurations for the golden images (GI) of the virtual machine (VM_1) to the migration destination storage apparatus 10B.

In addition, the virtual machine migration program 313 comprises a function for searching for snapshot volumes forming the virtual machine for which migration is instructed and for migrating these volumes to the migration destination storage apparatus 10. More specifically, the virtual machine migration program 313 specifies the logical volumes (deploy source golden image: deploy source GI) which are the sources of the snapshot volumes for which migration is instructed and determines whether the logical volumes corresponding to the logical volumes exist in the migration destination storage apparatus 10. Further, if the logical volumes corresponding to the migration destination storage apparatus 10 exist, the virtual machine migration program 313 associates the migration target snapshot volume with the logical volume.

Accordingly, in this embodiment, because snapshot volume migration processing can be performed by using the logical volume (golden image: GI) of the migration destination storage apparatus 10, the data copy size at the time of snapshot volume migration between storage apparatuses can be minimized and the processing time to migrate the snapshot volume can be reduced.

(3) Computer System Operation (3-1) Details of Migration Processing Using Management Server Virtual machine migration processing which is executed by the virtual machine migration program 313 of the management server 30 will be described next. The virtual machine migration processing is executed in response to data migration being instructed by an administrator or the like via the input screen of the management server 30. Note that although the subject of the various processing is program in the following description, it goes without saying that, in reality, the CPU 33 of the management server 30 executes the processing on the basis of the program. Hereinafter, the migration source storage apparatus 10 is described as the first storage apparatus 10A and the migration destination storage apparatus 10 is described as the second storage apparatus 10B.

Figure 15:
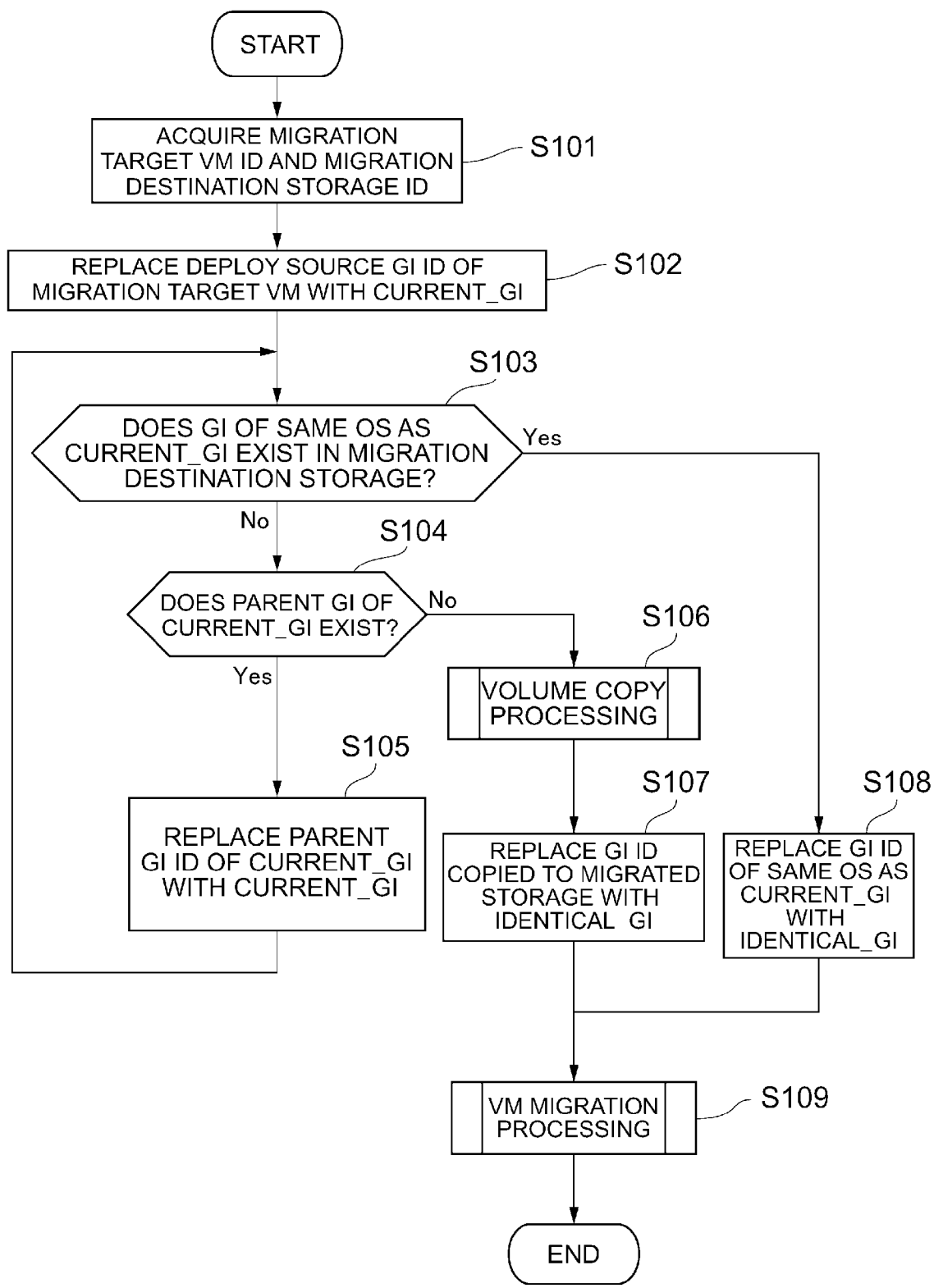
FIG. 15 is a flowchart showing details of the virtual machine migration processing according to the embodiment.

As shown in FIG. 15, the virtual machine migration program 313 first gets the ID of the migration target virtual machine (VM) and the ID of the migration destination second storage apparatus 10B (S101). Furthermore, the ID of the deploy source golden image (GI) of the migration target virtual machine (VM) is replaced with a variable Current GI. For example, as shown in FIG. 13, if the ID of the migration target virtual machine is VM_1, the virtual machine migration program 313 references the virtual machine management table 312 and replaces the ID (GI_2) of the VM_1 deploy source GI with the variable Current GI.

Furthermore, the virtual machine migration program 313 determines whether the golden image (GI) of the same OS as the variable Current GI exists in the migration destination second storage apparatus 10B (S103). For example, as mentioned above, if the GI_2 is replaced with a variable Current GI, the virtual machine migration program 313 references the logical volume management table 311 to determine whether the same OS (WinSP1) as the GI_2 exists in the migration destination second storage apparatus 10B. Upon referencing the logical volume management table 311 in FIG. 13, it is clear that the GI_3 of the same OS (WinSP1) as the GI_2 exists in the storage apparatus 10B.

If it is determined in step S103 that a golden image (GI) of the same OS as the variable Current_GI exists in the migration destination storage apparatus 10, the virtual machine migration program 313 replaces the ID of the golden image (GI) of the same OS as the Current_GI with a variable Identical_GI (S108). For example, if the GI_2 is replaced with the variable Current_GI, the GI_3 of the same OS as the GI_2 is replaced with the variable Current_GI in step S108. Here, if there are a plurality of golden images (GI) of the same OS as Current_GI in the migration destination storage apparatus 10, the performance of the golden images (GI) is considered and the golden image (GI) which has the least effect on the performance may be selected and replaced with a variable Identical_GI.

On the other hand, if it is determined in step S103 that the golden image (GI) of the same OS as the variable Current_GI does not exist in the migration destination second storage apparatus 10B, the virtual machine migration program 313 determines whether the parent GI of the variable Current_GI exists in the migration destination second storage apparatus 10B (S104).

If it is determined in step S104 that the parent GI of the variable Current_GI exists in the migration destination second storage apparatus 10, the virtual machine migration program 313 replaces the ID of the parent GI of the variable Current_GI with the variable Current_GI (S105) and repeats the processing of step S103 and subsequent steps. Even when the same OS as the golden image (GI) of the virtual machine deploy source does not exist in the migration destination second storage apparatus 10B, if the parent GI of the GI exists, the deploy source GI can be prepared at the migration destination by using the parent GI of the migration destination second storage apparatus 10B. Accordingly, there is no need to copy all the generation configurations of the deploy source GI of the virtual machine to the migration destination second storage apparatus 10B.

If, on the other hand, it is determined in step S104 that the parent GI of the variable Current_GI does not exist in the migration destination storage apparatus 10, the virtual machine migration program 313 executes volume copy processing (S106). The volume copy processing in step S106 is processing to copy the deploy source golden image volume of the migration target virtual volume to the migration destination second storage apparatus 10B. The volume copy processing in step S106 will be described subsequently in detail.

Furthermore, after executing the volume copy processing of the golden image volume in step S106, the virtual machine migration program 313 replaces the ID of the golden image (GI) copied to the migration destination second storage apparatus 10B with the variable Identical_GI (S107).

The virtual machine migration program 313 then executes virtual machine (VM) migration processing (S109) and ends the processing. More specifically, the virtual machine migration program 313 migrates the snapshot volume forming the virtual machine (VM) from the migration source first storage apparatus 10A to the migration destination second storage apparatus 10B. As mentioned earlier, if a GI or GI parent GI which has the same OS as the deploy source GI of the migration target snapshot volume exists in the migration destination second storage apparatus 10B, the virtual machine migration program 313 is able to migrate the snapshot volume by using the GI of the migration destination second storage apparatus 10B.

(3-1-1) Details of the Snapshot Migration Processing by the Management Server

Figure 16:
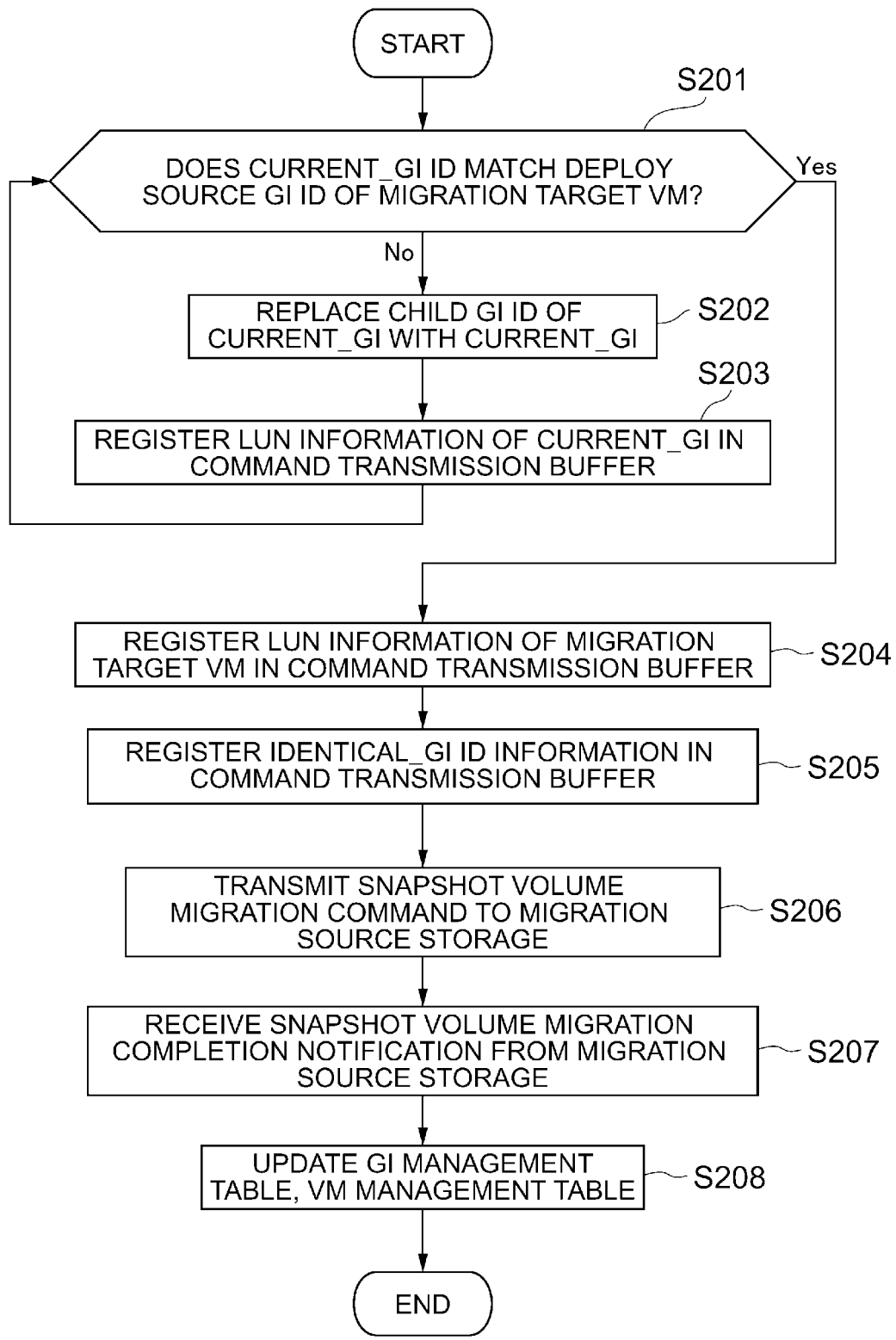
FIG. 16 is a flowchart showing details of snapshot volume migration processing according to the embodiment.

The virtual machine (VM) migration processing in step S109 of FIG. 15 will be described next. As shown in FIG. 16, the virtual machine migration program 313 determines whether the ID of the GI replaced with the variable Current_GI matches the ID of the deploy source GI of the migration target virtual machine (VM) (S201).

If it is determined in step S201 that the ID of the GI replaced with the variable Current_GI matches the ID of the deploy source GI of the migration target virtual machine (VM), the virtual machine migration program 313 executes the processing of step S203 and subsequent steps.

If, on the other hand, it is determined in step S201 that the ID of the GI replaced with the variable Current_GI does not match the ID of the deploy source GI of the migration target virtual machine (VM), the virtual machine migration program 313 replaces the child GI ID of the variable Current_GI with the variable Current_GI (S202). The virtual machine migration program 313 then registers LUN information for the GI replaced with the variable Current_GI in a command transmission buffer (S203).

Suppose, for example, that the parent GI of the deploy source GI of the migration target snapshot volume exists in the migration destination second storage apparatus 10B. In this case, the ID of the parent GI is replaced with the variable Current_GI in step S105 of FIG. 15. Therefore, as a result of replacing the ID of the child GI of the variable Current_GI with the variable Current_GI in step S202 of FIG. 16, LUN information for the differential GI of the golden image volume between the migration source first storage apparatus 10A and the migration destination second storage apparatus 10B is registered in the command transmission buffer.

The virtual machine migration program 313 then registers the LUN information of the migration target virtual machine (VM) in the command transmission buffer (S204). The virtual machine migration program 313 then registers ID information of the variable Identical_GI in the command transmission buffer (S205).

As shown in steps S107 and S108 in FIG. 15, if the same OS as the deploy source GI of the snapshot volume forming the virtual machine (VM) exists in the migration destination second storage apparatus 10B, the ID of the GI is replaced with the variable Identical_GI. Further, if the same OS as the deploy source GI of the snapshot volume forming the virtual machine (VM) does not exist in the migration destination second storage apparatus 10B, the ID of the GI volume copied to the migration destination second storage apparatus 10B is replaced with the variable Identical_GI. Therefore, the variable Identical_GI stores the ID of the GI volume serving as the deploy source of the migration target snapshot volume at the migration destination.

The virtual machine migration program 313 then transmits the snapshot volume migration command to the migration source first storage apparatus 10A (S206). Further, after a snapshot volume is migrated between storage apparatuses 10, the virtual machine migration program 313 receives a snapshot volume migration completion notification from the migration source first storage apparatus 10A (S207).

After receiving the snapshot volume migration completion notification from the storage apparatus 10A in step S207, the virtual machine migration program 313 updates the logical volume management table 311 and the virtual machine management table 312 (S208). If, in step S208, a golden image (GI) has been newly copied to the migration destination second storage apparatus 10B, the virtual machine migration program 313 adds information relating to the ID of the added GI to the logical volume management table 311. Further, since the ID of the deploy source GI of the snapshot volume has changed from the GI of the migration source storage apparatus 10A to the GI (GI_3) of the migration destination storage apparatus 10B, the ID of the deploy source GI of the migration target virtual machine (VM_1) is, as shown in the virtual machine management table 312B, updated to the deploy source GI (GI_3) of the migration destination second storage apparatus 10B.

Figure 17:
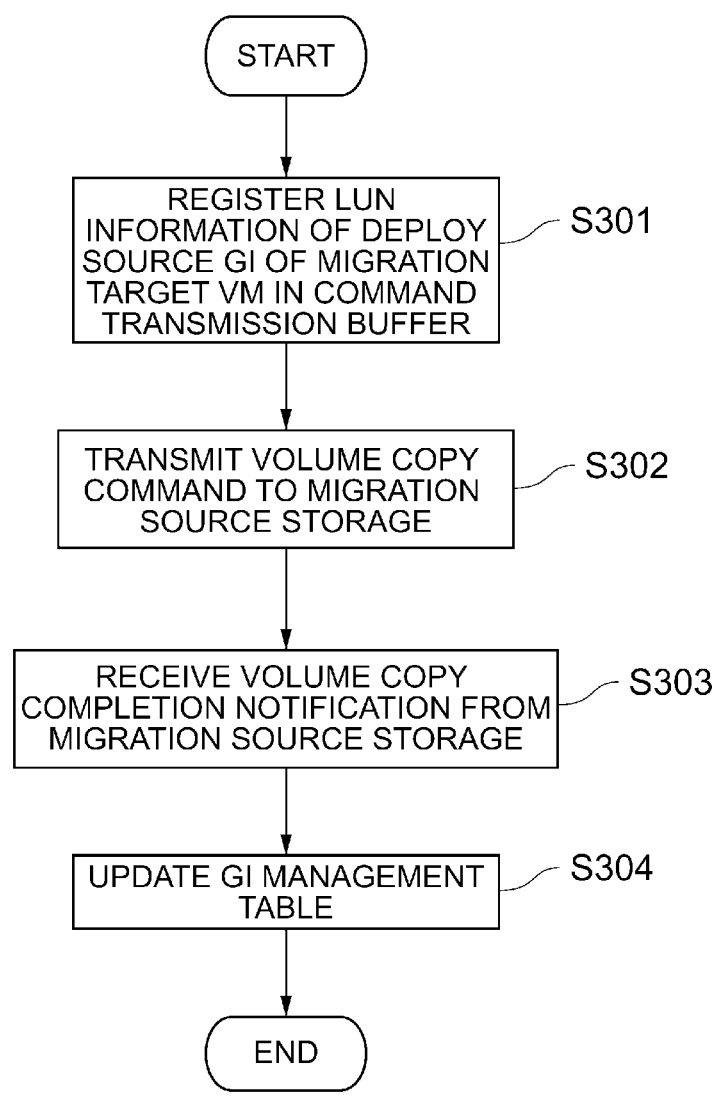
FIG. 17 is a flowchart showing details of the logical volume migration processing according to the embodiment.

(3-1-2) Details of the Logical Volume Migration Processing by the Management Server Details of volume copy processing in step S106 of FIG. 15 will be described next. As shown in FIG. 17, the virtual machine migration program 313 registers the LUN information of the deploy source GI of the migration target virtual machine (VM) in the command transmission buffer (S301). The virtual machine migration program 313 then transmits a volume copy command to the migration source first storage apparatus 10A (S302). Further, after GI volume copying between the storage apparatuses 10 is complete, the virtual machine migration program 313 receives a GI volume copying completion notification from the migration source first storage apparatus 10A (S303).

The virtual machine migration program 313 then updates the logical volume management table 311 (S304). In step S304, the virtual machine migration program 313 adds information on the volume-copied GI to the logical volume management table 304.

(3-3) Details of the Migration Processing by the Storage Apparatus (3-3-1) Details of the Logical Volume Migration Processing between Storage Apparatuses First, the logical volume migration processing which is executed between the migration source first storage apparatus 10A and the migration destination second storage apparatus 10B will be described. The logical volume migration processing shown hereinbelow is executed if the GI or parent GI of the GI of the same OS as the deploy source GI of the migration target snapshot volume does not exist in the migration destination second storage apparatus 10B.

Figure 18:
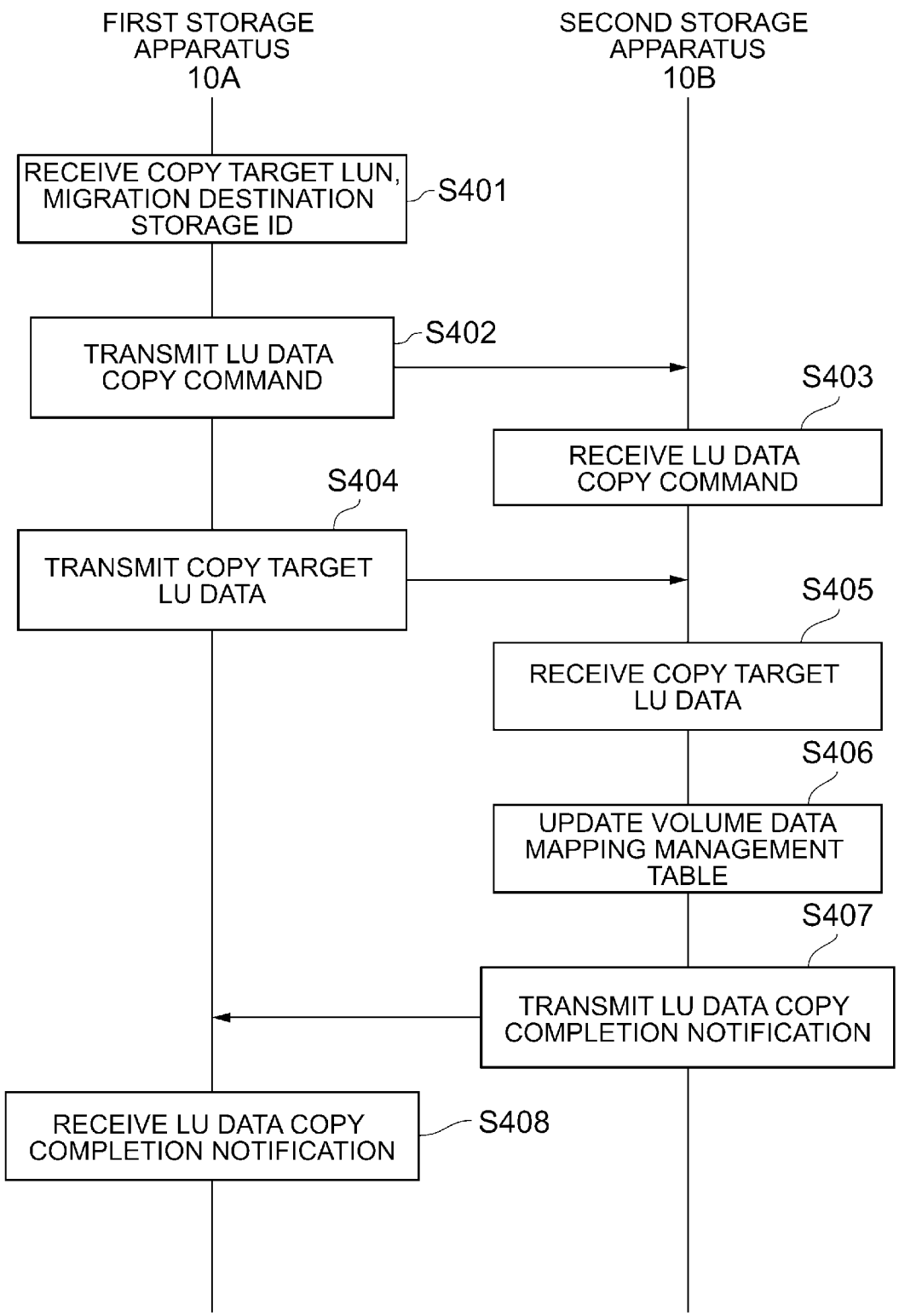
FIG. 18 is a flowchart showing details of logical volume migration processing according to the embodiment.

As shown in FIG. 18, the first storage apparatus 10A receives the LUN of the copy target logical volume (GI) and the storage ID of the migration destination second storage apparatus 10B from the management server 30 (S401).

The first storage apparatus 10A then transmits a logical unit (LU) data copy command to the migration destination second storage apparatus 10B (S402). Here, LU signifies a golden image (GI) logical volume.

The migration destination second storage apparatus 10B receives the LU data copy command transmitted from the migration source first storage apparatus 10A in step S402 (S403).

The first storage apparatus 10A then transmits the copy target LU data to the second storage apparatus 10B (S404). The second storage apparatus 10B receives the copy target LU data transmitted from the first storage apparatus 10A in step S404 (S405).

Further, the migration destination second storage apparatus 10B copies the copy target LU data received in step S405 and updates the volume data mapping management table 152 (S406). More specifically, the second storage apparatus 10B copies the LU data transmitted from the first storage apparatus 10A and gets the physical address of the storage area to which the LU data is copied. [The second storage apparatus 10B] then adds the gotten physical address to the volume data mapping management table 152 in association with the logical address of the LU data.

The second storage apparatus 10B then transmits a notification to the effect that LU data copying is complete to the first storage apparatus 10A (S407). The first storage apparatus 10A then receives the LU data copy completion notification transmitted from the second storage apparatus 10B in step S407 (S408).

(3-3-2) Details of the Snapshot Volume Migration Processing between Storage Apparatuses The snapshot volume migration processing executed between the migration source first storage apparatus 10A and the migration destination second storage apparatus 10B will be described next. As shown in FIG. 19, the first storage apparatus 10A receives the LUN of the copy target logical volume (GI) and the virtual machine (VM), and the ID of the migration destination storage apparatus 10 and the ID of the logical volume (GI) replaced with the variable Identical_GI, from the management server 30 (S411).

The migration source first storage apparatus 10A then transmits a logical unit (LU) snapshot data copy command to the migration destination second storage apparatus 10B (S412). Here, LU snapshot data signifies snapshot differential data for the golden image (GI) logical volume.

The migration destination second storage apparatus 10B receives the LU snapshot data copy command transmitted from the migration source first storage apparatus 10A in step S411 (S413).

The first storage apparatus 10A subsequently transmits copy target LU snapshot data, data mapping information, and the ID of the logical volume (GI) replaced with the variable Identical_GI to the second storage apparatus 10B (S414). The second storage apparatus 10B receives the copy target LU snapshot data, the data mapping information, and the ID of the logical volume (GI) replaced with the variable Identical_GI that was transmitted from the first storage apparatus 10A in step S414 (S415).

Further, the migration destination second storage apparatus 10B copies the copy target LU snapshot data received in step S415 and updates the volume data mapping management table 152 (S416). More specifically, the second storage apparatus 10B copies the LU snapshot data transmitted from the first storage apparatus 10A and gets the physical address of the storage area to which the snapshot data is copied. [The second storage apparatus 10B] then adds the gotten physical address to the volume data mapping management table 152 in association with the LU snapshot data logical address.

For example, FIG. 10 is the volume data mapping management table 152D which was updated in step S416. The volume data mapping management table 152D is obtained as a result of adding the information on the logical volume (GI) of the LUN 103 to the pre-migration volume data mapping management table 152B. As shown in the volume data mapping management table 152D, the physical addresses (P5210, P5231) of the storage areas to which the differential data of the snapshot volume is copied are stored in association with the logical addresses (L3001, L3121). Further, in addition to the snapshot volume differential data, the physical address field 1523 stores the logical address of the logical volume (LUN 102) of the snapshot volume deploy source.

Further, the second storage apparatus 10B transmits a notification to the effect that the copying of the LU snapshot data is complete to the first storage apparatus 10A (S417). The first storage apparatus 10A then receives the LU snapshot data copying completion notification transmitted from the second storage apparatus 10B in step S417 (S418).

The first storage apparatus 10A subsequently deletes the LU data of the snapshot volume of the migration target virtual machine (S419). [The first storage apparatus 10A] then deletes the information of the LU data thus deleted in step S419 from the volume data mapping management table (S420).

(4) Advantageous Effects of Embodiment

As described hereinabove, according to the embodiment, even when there is a difference between the generation configurations of the migration-source and migration-destination golden images (primary volume), it is possible to migrate a snapshot volume by using the primary volume of the migration destination storage apparatus. Accordingly, the data copy size at the time of snapshot volume migration between storage apparatuses can be minimized and the processing time to migrate the snapshot volume can be reduced.

(5) Further embodiments

For example, each of the steps in the processing of the storage apparatuses 10 or the management server 30 in this specification need not necessarily be processed chronologically in the order represented as a flowchart. That is, each of the steps in the processing of the storage apparatuses 10 or the management server 30 may also be executed in parallel even with different processing.

Moreover, computer programs for causing hardware such as the CPU, ROM and RAM and the like installed in the storage apparatuses 10 or the management server 30 or the like to exhibit the same functions as each of the configurations of the storage apparatuses 10 or the management server 30 described earlier can also be created. Storage media for storing the computer programs may also be provided.

REFERENCE SIGNS LIST

1 Computer system
10 Storage apparatus
11 Target port
13 Bus
14 Cache memory
15 Memory
17 Storage device
18 Initiator port
151 Snapshot configuration management table
152 Volume data mapping management table
153 Volume copy program
154 Snapshot volume migration program
20 Host
21 Management interface
22 Memory
23 Bus
25 Storage device
26 I/O device
27 Initiator port
201 Logical volume
221 Application program
222 VM program
223 Hypervisor
30 Management server
31 Memory
32 Bus
34 Storage device
35 I/O device
304 Logical volume management table
311 Logical volume management table
312 Virtual machine management table
313 Virtual machine migration program
40 Network

The invention claimed is:

1. A storage system coupled to a host which issues data write requests to a first storage apparatus,
    wherein the storage system comprises the first storage apparatus, a second storage apparatus, and a management server configured to manage the first storage apparatus and the second storage apparatus,
    wherein the first storage apparatus comprises first storage devices providing first storage areas, and a first storage controller configured to create a logical volume, a first snapshot volume, and a second snapshot volume in the first storage areas,
    wherein the first snapshot volume and the second snapshot volume are data images derived from the logical volume, and a generation of the first snapshot volume is prior to a generation of the second snapshot volume,
    wherein the second storage apparatus comprises second storage devices providing second storage areas, and a second storage controller configured to create at least one snapshot volume in the second storage areas,
    wherein the management server comprises a management controller configured to manage relationships among generations of volumes including the logical volume, the first snapshot volume, and the second snapshot volume, and
    wherein when the second snapshot volume is to be copied from the first storage apparatus to the second storage apparatus, the management server is configured to:
        execute a determination whether or not the first snapshot volume, whose generation is posterior to a generation of the logical volume and prior to the generation of the second snapshot volume, exists in the second storage apparatus; and
        in a case that the first snapshot volume exists in the second storage apparatus, send the first storage apparatus an instruction to copy differential data between the first snapshot volume and the second snapshot volume according to the determination.

2. The storage system according to claim 1,
    wherein, when the first snapshot volume exists in the second storage apparatus, the management controller of the management server is configured to copy the differential data between the second snapshot volume and the first snapshot volume to the second storage apparatus and to associate the copied differential data with the first snapshot volume which exists in the second storage apparatus.

3. The storage system according to claim 1,
    wherein the management controller of the management server is configured to manage generation configurations of the snapshot volumes by associating the snapshot volumes with parent volumes of the snapshot volumes in a snapshot volume management table.

4. The storage system according to claim 3,
    wherein, when the second snapshot volume is copied and associated with the first snapshot volume, the management controller of the management server is configured to associate the copied second snapshot volume with the first snapshot volume and to add the same to the snapshot volume management table.

5. The storage system according to claim 1,
    wherein, when the first snapshot volume exists in the second storage apparatus, the management controller of the management server is configured to associate the second snapshot volume with the first snapshot volume.

6. The storage system according to claim 1,
wherein, when the first snapshot volume does not exist in the second storage apparatus, the management controller of the management server is configured to copy the first snapshot volume and the logical volume which is the parent volume of the first snapshot volume and to associate the second snapshot volume with the copied first snapshot volume and the logical volume.

7. The storage system according to claim 1,
wherein a golden image is stored in a parent volume, and
wherein the management controller of the management server is configured to receive a migration instruction to migrate a virtual machine formed by a snapshot volume, to specify a generation of the snapshot volume used in the virtual machine, and to make the generation a copy target.

8. A management server in which a first storage apparatus, a second storage apparatus, and a host which issues data write requests to the first storage apparatus are connected via a network,
wherein the first storage apparatus comprises first storage devices providing first storage areas, and a first storage controller configured to create a logical volume, a first snapshot volume, and a second snapshot volume in the first storage areas,
wherein the first snapshot volume and the second snapshot volume are data images derived from the logical volume, and a generation of the first snapshot volume is prior to a generation of the second snapshot volume,
wherein the second storage apparatus comprises second storage devices providing second storage areas, and a second storage controller configured to create at least one snapshot volume in the second storage areas,
wherein the management server comprises a management controller configured to manage relationships among generations of volumes including the logical volume, the first snapshot volume, and the second snapshot volume, and
wherein when the second snapshot volume is to be copied from the first storage apparatus to the second storage apparatus, the management server is configured to:
execute a determination whether or not the first snapshot volume, whose generation is posterior to a generation of the logical volume and prior to the generation of the second snapshot volume, exists in the second storage apparatus; and
in a case that the first snapshot volume exists in the second storage apparatus, send the first storage apparatus an instruction to copy differential data between the first snapshot volume and the second snapshot volume according to the determination.

9. The management server according to claim 8,
wherein, when the first snapshot volume exists in the second storage apparatus, the management controller is configured to copy differential data between the second snapshot volume and the first snapshot volume to the second storage apparatus and to associate the copied differential data with the first snapshot volume which exists in the second storage apparatus.

10. The management server according to claim 8,
wherein the management controller is configured to manage generation configurations of the snapshot volumes by associating the snapshot volumes with parent volumes of the snapshot volumes in a snapshot volume management table.

11. The management server according to claim 10,
wherein, when the second snapshot volume is copied and associated with the first snapshot volume, the management controller is configured to associate the copied second snapshot volume with the first snapshot volume and to add the same to the snapshot volume management table.

12. The management server according to claim 8,
wherein, when the first snapshot volume of the designated generation exists in the second storage apparatus, the management controller is configured to associate the second snapshot volume with the existing first snapshot volume.

13. The management server according to claim 8,
wherein, when the first snapshot volume does not exist in the second storage apparatus, the management controller is configured to copy the first snapshot volume and the logical volume which is the parent volume of the snapshot volume and to associate the second snapshot volume with the copied first snapshot volume and the logical volume.

14. The management server according to claim 8,
wherein a golden image is stored in a parent volume, and
wherein the management controller server is configured to receive a migration instruction to migrate a virtual machine formed by a snapshot volume, to specify a generation of the snapshot volume used in the virtual machine, and to make the generation a copy target.

* * * * *